United States Patent Office 3,506,735
Patented Apr. 14, 1970

3,506,735
PROCESS FOR THE PREPARATION OF ADHESIVES, PUTTIES, COATING MATERIALS OR SEALING COMPOUNDS BASED ON MODIFIED TRIGLYCIDYL ISOCYANURATES
Zissis Aggias, Hilden, Rhineland, Germany, assignor to Henkel & Cie G.m.b.H., Dusseldorf, Germany, a corporation of Germany
No Drawing. Filed Nov. 16, 1967, Ser. No. 683,444
Claims priority, application Germany, Nov. 30, 1966, H 61,149
Int. Cl. C08g 45/12, 30/14
U.S. Cl. 260—830          7 Claims

ABSTRACT OF THE DISCLOSURE

The present invention relates to epoxide resin mixtures for adhesives, putties, coating materials and sealing compounds, based on glycidyl isocyanurates and organic amine epoxide resin hardeners, which are hardenable at room temperature which comprise (A) 100 parts by weight of a mixture of compounds having epoxide groups consisting of (1) from 50 to 91 parts by weight of a modified glycidyl isocyanurate reaction product of 10 mols of crystalline triglycidyl isocyanurate having an epoxide oxygen content of at least 14% with from 0.1 to 3.0 mols of an organic compound containing at least one isocyanate group in the molecule and free of other epoxide reacting substituents and (2) 50 to 9 parts by weight of a liquid, low-molecular-weight glycidyl compound having a molecular weight of less than 450 and a Hoppler viscosity of less than 15,000 cp. at 20° C., and (B) from 20 to 200 parts by weight of an organic amine epoxide resin hardener selected from the group consisting of aliphatic amines and cycloaliphatic amines.

THE PRIOR ART

Adhesives based on crystalline triglycidyl isocyanurate and so-called heat-hardeners are known per se. For example, firm adhesive bonds between metals can be effected with these usually powdery mixtures, which exhibit excellent shear strengths, even at high temperatures. However, relatively high hardening temperatures of about 150° C. are required to effect such adhesive bands.

OBJECT OF THE INVENTION

An object of the invention is to develop adhesives, based on triglycidyl isocyanurates, which can be applied at room temperature in liquid or pasty form and which will harden at room temperature into firm adhesive bonds.

Another object of the invention is to obtain epoxide resin mixtures for adhesives, putties, coating materials and sealing compounds, based on glycidyl isocyanurates and organic amine epoxide resin hardeners, which are hardenable at room temperature which comprise (A) 100 parts by weight of a mixture of compounds having epoxide groups consisting of (1) from 50 to 91 parts by weight of a modified glycidyl isocyanurate reaction product of 10 mols of crystalline triglycidyl isocyanurate having an epoxide oxygen content of at least 14% with from 0.1 to 3.0 mols of an organic compound containing at least one isocyanate group in the molecule and free of other epoxide reacting substituents and (2) 50 to 9 parts by weight of a liquid, low-molecular-weight glycidyl compound having a molecular weight of less than 450 and a Hoppler viscosity of less than 15,000 cp. at 20° C., and (B) from 20 to 200 parts by weight of an organic amine epoxide resin hardener selected from the group consisting of aliphatic amines and cycloaliphatic amines.

These and other objects of the invention will become more apparent as the description thereof proceeds.

DESCRIPTION OF THE INVENTION

It has now been ascertained, that these objects can be achieved in that mixtures are used, which are characterized by a content of the following ingredients:
(a) 50 to 100 parts by weight of a glycidyl isocyanurate modified with isocyanates.
(b) 10 to 50 parts by weight of a low-molecular-weight, liquid compound containing one or several glycidyl groups, having a molecular weight of less than 450 and a Hoppler viscosity of less than 15,000 at 20° C., preferably less than 2,000 cp. at 20° C.
(c) 20 to 100 parts by weight of an aliphatic and/or cycloaliphatic amine epoxide resin hardener, preferably a liquid amine, and
(d) possibly additional inert excipients.

More particularly the invention relates to epoxide resin mixtures for adhesives, putties, coating materials and sealing compounds, based on glycidyl isocyanurates and organic amine epoxide resin hardeners, which are hardenable at room temperature which comprise (A) 100 parts by weight of a mixture of compounds having epoxide groups consisting of (1) from 50 to 91 parts by weight of a modified glycidyl isocyanurate reaction product of 10 mols of crystalline triglycidyl isocyanurate having an epoxide oxygen content of at least 14% with from 0.1 to 3.0 mols of an organic compound containing at least one isocyanate group in the molecule and free of other epoxide reacting substituents and (2) 50 to 9 parts by weight of a liquid, low-molecular-weight glycidyl compound having a molecular weight of less than 450 and a Hoppler viscosity of less than 15,000 cp. at 20° C., and (B) from 20 to 200 parts by weight of an organic amine epoxide resin hardener selected from the group consisting of aliphatic amines and cycloaliphatic amines. These epoxide resin mixtures can, particularly when used as adhesives or pastes, contain other inert excipients customarily added to epoxide resin adhesive formulations. These epoxide resin mixtures which are liquid to pasty at room temperature harden at room temperature over a period of from about 2 to 30 hours to form firm bonds.

Crystalline triglycidyl isocyanurate having an epoxide oxygen content of at least 14%, serves as basis for the glycidyl isocyanurates modified with isocyanates. Crystalline triglycidyl isocyanurate having an epoxide oxygen content of at least 14% is described in United States Patent No. 3,337,509, dated Aug. 22, 1967. These products can be prepared by reacting cyanuric acid with an excess of epichlorohydrin and subsequent purification by crystallization from a suitable solvent.

For the modfication of the crystalline triglycidyl isocyanurate, isocyanates containing one or several isocyanate groups, preferably, however, two free isocyanate groups, and no other epoxide reacting groups, are employed. The crystalline triglycidyl isocyanurate having an epoxide oxygen content of at least 14% is modified by reacting 10 mols of the same with from 0.1 to 3.0 mols of the isocyanate at a temperature above the melting point of the ingredients for a time sufficient for the reaction product to attain a constant epoxide value. The reaction is preferably conducted at temperatures of 110° C. to 150° C. for a period of from ½ to 6 hours while agitating. Suitable isocyanates for this modification are, for example, compounds having a molecular weight of about 100 to 3500, said compound containing at least one isocyanate group in the molecule and free of other epoxide reacting substituents. Among the lower-molecular-weight isocyanates are, for example, alkylisocyanates such as hexylisocyanate, octylisocyanate, dodecylisocyanate, octadecylisocyanate; alkenyl isocyanates such as oleylisocyanate; dicycloalkyl-alkylisocyanates such as 4-dicyclohexylmethane isocyanate; phenylisocyanate; alkylphenylisocyanates such as the isomeric tolylenisocyanates; alkylenediisocyanates such as hexanediisocyanate, dodecanediisocyanate; the isocyanates which can be obtained from dimerized fatty acid chlorides, for examples, by Curtius rearrangement; dicycloalkylalkane diisocyanates such as dicyclohexylmethane-4,4'-diisocyanate; alkylphenyl diisocyanates such as the isomeric toluylenediisocyanates; naphthalene - 1,5-diisocyanate; diphenylalkane diisocyanates such as 3,3'-dimethoxy-diphenylmethane-4,4'-diisocyanate, as well as the addition products of diisocyanates with alkanediols and alkanetriol such as the adduct of 3 mols of toluylenediisocyanate with 1 mol of trimethylolpropane.

However, preferably, those isocyanate compounds containing two free isocyanate groups are employed which have a molecular weight of from about 1000 to 3500. Among those compounds are those which have been prepared from linear polyethers and/or polyesters having a molecular weight of about 800 to 3000. These products are also known per se. For their preparation, for example, polyglycols, such as polyethylene glycol, polypropylene glycol or polybutylene glycol, having a molecular weight of about 800 to 3000, can be reacted with low-molecular-weight diisocyanates having molecular weights up to about 400, such as toluylenediisocyanate, diphenylmethane diisocyantae, hexamethylene diisocyanate and others, allotting at least one molar equivalent of the diisocyanate for each hydroxyl group. Such compounds containing isocyanate groups are known as so-called "prepolymers" for the preparation of polyurethane plastics. For the preparation of the modified glycidyl isocyanurate, to be used according to the invention, particularly a reaction product from polybutylene glycol-1,4 with a molecular weight between 1000 and 2000 and the previously mentioned low-molecular-weight diisocyanates is used.

Also preferably used for the modification are polyesters containing at least two free isocyanate groups, having been prepared from polyesters containing free OH-groups and having a molecular weight of 800 to 3000. To obtain these polyesters, low-molecular-weight dicarboxylic acids and an excess of polyhydric alcohols can be esterified. Suitable carboxylic acids are, for example, alkanedioic acids such as adipic acid, succinic acid, sebacic acid; benzene dicarboxylic acids such as phthalic acid, terephthalic acid; cycloalkane dicarboxylic acids such as hexahydroterephthalic acid; alkenedioic acids such as maleic acid, fumaric acid, etc. Suitable alcohols are, for example, alkanediols such as ethylene glycol, propylene glycol, neo-pentyl glycol, hexanediol; diethylene glycol or thiodiglycol. Moreover, such polyesters containing OH-groups can be prepared from lactams, as for example, caprolactam. The reaction into polyesters containing terminal isocyanate groups is effected with the same diisocyanates as previously mentioned.

The adhesives, putties, coating materials or sealing compounds of the invention should contain, in addition, compounds with one or several glycidyl radicals known as reactive diluents. These glycidyl compounds should be liquid at room temperature and have a molecular weight of less than 450 and a Hoppler viscosity of less than 15,000 cp. at 20° C., preferably less than 2000 cp. at 20° C. Suitable compounds are, for example, hydrocarbons containing an epoxide group such as phenylglycidyl ether, butylglycidyl ether, octylglycidyl ether, furfurylglycidyl ether, glycidyl benzoate, styrene oxide and octene oxide, butanedioldiglycidyl ether, diglycidyl adipate, diglycidyl sebacate, diglycidyl phthalate, limonene dioxide, N,N-diglycidyl aniline, diethyleneglycoldiglycidyl ether, dipropyleneglycoldiglycidyl ether, the triglycidyl ethers of glycerine and of trimethylolpropane. Simultaneously, at a lesser amount glycidyl compounds which are solid at room temperature may also be used, such as stearylglycidyl ether, glycidyl stearate, hexanedioldiglycidyl ether, hydroquinonediglycidyl ether, resorcinoldiglycidyl ether, diglycidyl terephthalate. Small portions of liquid low-molecular-weight epoxide resins based on diphenylolpropane may also be added.

Moreover, the adhesives of the invention contain aliphatic and/or cycloaliphatic amines as epoxide resin hardeners. These amines may also contain one or several primary and/or secondary and/or tertiary amine groups in the molecule. Examples for the amines to be employed according to the process of the invention are the following: alkylamines such as propylamine, hexylamine, dodecylamine; phenylalkylamines such as benzylamine; alkylene diamines such as ethylenediamine, propylenediamine, butylenediamine, dimethylaminopropylamine, diethylaminopropylamine; alkyl polyamines such as diethylenetriamine, triethylenetetramine; cycloalkane diamines such as 1,2- or 1,4-diaminocyclohexane, 1,2-diamino-4-ethylcyclohexane, 1 - cyclohexyl-3,4-diaminocyclohexane, 4,4' - diaminodicyclohexylmethane; hydroxybenzylalkyl polyamines such as N-(4-hydroxybenzyl)-ethylenediamine, N-(4-hydroxybenzyl)-diethylenetriamine, N-(4-hydroxybenzyl) - triethylenetetramine; etc. In cyclic amines the amino nitrogen can be a constituent of the ring, for example, in the piperazine or N-(2-aminoethyl)-piperazine. Also suitable are polyamides containing free amino groups, in particular the reaction products from dimerized fatty acids and polyamines, which may contain imidazolidine rings in addition to free amino groups such as the "Versamides."

Moreover, such amines may be employed for the reaction according to the invention, which contain additional functional groups, as, for example, alkanolamines such as ethanolamine, propanolamine, or the reaction products of amines with ethylene oxide, propylene oxide or butylene oxide, such as N-(hydroxyethyl)-1,2-diaminopropane, N,N'-di-(hydroxybutyl)-diethylene triamine; dicyanethylethylene diamine; 1,4-bis-(γ-amino - propoxymethyl)-cyclohexane; etc.

For the adhesive compositions of the invention, it is preferable to utilize aliphatic or cycloaliphatic amines which are liquid at room temperature. Specifically preferable are the liquid hydroxybenzylalkyl polyamines.

In addition to the aliphatic or cycloaliphatic amines, aromatic amines at lesser amounts may be used concomitantly, as for example, 4,4' - diaminodiphenylmethane, 4,4'-diamino-3,3'-dichlorodiphenylmethane or 4,4'-diaminodiphenylsulfone.

The amount of the amines to be used may fluctuate in broad ranges. However, it has been found advantageous to use as a rule such amounts whereby about 0.6 to 1.1, in particular 0.8 to 1.0 reactive hydrogens attached to an amino-nitrogen in the amine molecule is allotted to each epoxide group in the reaction mixture to be reacted.

Furthermore, accelerators can be added to the mixtures of the invention, as, for example, compounds containing hydroxyl groups, such as phenols, tris-(dimethylaminomethyl)-phenol; tertiary amines or phosphines, such as N-alkylpiperidine or triphenylphosphine. Additionally as accelerators are considered quaternary ammonium bases or their salts, for example, benzyltrimethylammonium hydroxide or salts or sulfonium salts or phosphonium salts.

As inert excipients, the adhesives, putties, coating substances or sealing compounds of the invention may contain dyes and/or fillers, as for example, ground dolomite, aluminum oxide, silica, alumina, titanium dioxide, magnesium oxide, iron oxide, carbon black or also fibrous materials, such as asbestos, glass or rock fibers. If so desired, an addition of metallic powders may prove advantageous, such as iron powder, zinc powder, aluminum powder and chromium powder.

The mixtures of the invention may also contain inert organic solvents such as acetone, methylethyl ketone, ethyl acetate, butylacetate, toluene, xylene, methylene chloride, chloroform, trichloroethylene and others. The mixtures of the invention, dissolved in these solvents, can be employed as coating materials particularly for rigid surfaces. In this event, it is preferable to utilize a readily volatile solvent. The finished coatings are marked by a good adhesion to metals, such as iron, aluminum, zinc and the like.

The adhesives and putties of the invention are adaptable for bonding almost any rigid, as well as flexible materials. For example, metals such as aluminum, iron, stainless steel, copper, nickel, chromium, zinc, brass and titanium, can be joined in a firm manner with one another. They can also be used to cement or to putty glass, stones, concrete, ceramics, wood, plastics such as polyvinyl chloride, polystyrene, hardened melamine resin, urea resin, phenol resin and hardened polyester resins.

The adhesives and putties of the invention exhibit, at room temperature, a liquid or pasty consistency. They can be easily applied onto the materials to be bonded, and as a rule, they harden within a space of 24 hours. The adhesive bonds show a considerable shear strength at high temperatures, which is about as good as, if not definitely superior to, those adhesive bonds which are obtained in known fashion by heat-hardened triglycidyl isocyanurate compositions.

If adhesive bonds are to be effected with the epoxide resin mixtures of the invention, it is advantageous to join the materials to be bonded under a slight pressure of about 0.05 to some kp./cm.$^2$ until the bond hardens. Already, after a relatively short period of time satisfactory adhesive strengths are obtained.

The following examples are illustrative of the practice of the invention. They are not to be deemed limitative in any manner however.

EXAMPLES

*Preparation of the starting material.*—1 kg. of crystalline triglycidyl isocyanurate (mixture of the high- and low-melting forms; epoxide oxygen content=15.5%) was melted in a reaction vessel at a temperature of 125° C. Next, 430 gm. of the reaction product of about 1 mol of polybutyleneglycol-1,4 (molecular weight=1000) with about 2 mols of toluylene diisocyanate, having an isocyanate content=5.8%, were slowly added under constant stirring. After the isocyanate had been introduced, the melt was stirred for 2 hours at 150° C. A modified glycidyl isocyanurate was obtained, which had an epoxide oxygen content of 10.2% (product A). This preparation of the modified glycidylisocyanurate was repeated, however with the difference, that 670 gm. of the diisocyanate reaction product were used. The obtained reaction product had an epoxide oxygen content of 8.0% (product B).

Example 1

A mixture of the following components was prepared:

| | Gm. |
|---|---|
| Modified glycidyl isocyanurate (product A) | 80 |
| N,N-diglycidyl-aniline | 20 |
| Phenylglycidyl ether | 5 |
| N-(4-hydroxybenzyl)diethylenetriamine | 42 |

Degreased and polished aluminum sheets measuring 10 x 20 x 2 mm. were bonded with this liquid mixture in overlapping fashion. After these sheets had been stored for 24 hours at room temperature under a pressure of about 0.05 kp./cm.$^2$, a shear strength of 2.0 kp./mm.$^2$, was measured. At 80° C., this shear strength measured 1.5 kp./mm$^2$., and at 100° C. 1.0 kp./mm.$^2$.

Example 2

63 gm. of ground dolomite (grain size ~20μ) were added to the mixture of Example 1, and the adhesive bonding was repeated.

After storing the mixture at room temperature for 24 hours under a pressure of about 0.05 kp./cm.$^2$, the following average shear strengths were measured:

| At— | Kp./mm.$^2$ |
|---|---|
| 20° C. | 2.3 |
| 80° C. | 1.9 |
| 100° C. | 1.2 |

After the samples had been stored for 3 hours at 100° C. and under a pressure of 0.05 kp./cm.$^2$, the following average shear strengths were obtained:

| At— | Kp./mm.$^2$ |
|---|---|
| 20° C. | 2.2 |
| 80° C. | 1.7 |
| 100° C. | 1.3 |

Example 3

A mixture was prepared from the following components:

| | Gm. |
|---|---|
| Modified glycidyl isocyanurate (product A) | 75 |
| N,N,-diglycidyl-aniline | 25 |
| N-(4-hydroxybenzyl)-diethylenetriamine | 40 |
| Ground dolomite (grain size ~20μ) | 60 |

This adhesive was of a pasty consistency at room temperature. Degreased and polished aluminum sheets measuring 10 x 20 x 2 mm. were bonded with one another with a 2 cm.$^2$ overlap. After these sheets had been stored for 24 hours at room temperature, the following average shear strengths were measured:

| At— | Kp./mm.$^2$ |
|---|---|
| 20° C. | 2.1 |
| 80° C. | 1.2 |
| 100° C. | 1.1 |

Example 4

A mixture was prepared from the following components:

| | Gm. |
|---|---|
| Modified glycidyl isocyanurate (product B) | 70 |
| N,N-diglycidyl-aniline | 30 |
| N-(4-hydroxybenzyl)-diethylenetriamine | 40 |
| Ground dolomite (grain size ~20μ) | 60 |

The adhesive obtained was of pasty consistency at room temperature. Polished and degreased aluminum sheets were bonded in the manner commonly used. After the sheets had been stored for 24 hours at room temperature, the following average shear strengths were obtained:

| At— | Kp./mm.$^2$ |
|---|---|
| 20° C. | 2.2 |
| 80° C. | 1.0 |
| 100° C. | 0.8 |

Example 5

60 gm. of modified glycidyl isocyanurate (product A) were dissolved in 190 gm. of methylene chloride, 5 gm. of phenylglycidyl ether and 24 gm. of N-(hydroxybenzyl)-diethylenetriamine were added to this solution. The homogeneous solution remained stable for 6 hours without any visible external change. Then, iron plates measuring 5 x 10 cm., were immersed in the solution. After draining off the excess solution and after evaporation of the solvent, a coat of lacquer having a thickness of about 25μ adhered to the plates, which was completely dry after about 24 hours at room temperature. Grid-cut, grade 1; Erickson-depth=7 mm.

The preceding specific embodiments are illustrative of the practice of the invention. It is to be understood, however, that other expedients known to those skilled in the art can be employed without departing from the spirit of the invention or the scope of the appended claims.

I claim:
1. Epoxide resin mixtures for adhsives, putties, coating materials and sealing compounds, based on glycidyl isocyanurates and organic amine epoxide resin hardeners, which are hardenable at room temperature which comprise (A) 100 parts by weight of a mixture of compounds having epoxide groups consisting of (1) from 50 to 91 parts by weight of a modified glycidyl isocyanurate reaction product of 10 mols of crystalline triglycidyl isocyanurate having an epoxide oxygen content of at least 14% with from 0.1 to 3.0 mols of an organic compound containing at least one isocyanurate group in the molecule and free of other epoxide reacting substituents and (2) 50 to 9 parts by weight of a liquid, low-molecular-weight glycidyl compound having a molecular weight of less than 450 and a Hoppler viscosity of less than 15,000 cp. at 20° C., and (B) from 20 to 200 parts by weight of an organic amine epoxide resin hardener selected from the group consisting of aliphatic amines and cycloaliphatic amines.
2. The epoxide resin mixture of claim 1 wherein inert excipients are present.
3. The epoxide resin mixture of claim 1 wherein said modified glycidyl isocyanurate is modified with a linear isocyanate compound having two free isocyanate groups in the molecule and a molecular weight of from about 1000 to 3500.
4. The epoxide resin mixture of claim 3 wherein said linear isocyanate compound is the reaction product of an aliphatic compound having two terminal hydroxyl groups and a molecular weight between 800 and 3000 selected from the group consisting of polyethers and polyesters with a excess of a low-molecular-weight diisocyanate.
5. The epoxide resin mixture of claim 4 wherein said linear isocyanate compound is the reaction product of polybutyleneglycol-1,4 having a molecular weight of between 1000 and 2000 with a low-molecular-weight diisocyanate.
6. The epoxide resin mixture of claim 1 wherein said organic amine epoxide resin hardener is liquid at room temperature.
7. The epoxide resin mixture of claim 1 wherein said organic amine epoxide resin hardener is present in an amount that from 0.6 to 1.1 reactive hydrogens attached to an amino nitrogen atom is allotted for each epoxide group in the mixture.

References Cited

UNITED STATES PATENTS 3,404,196  10/1968  Weinrich.
3,337,509  8/1967  Budnowski.

HOSEA E. TAYLOR, Jr., Primary Examiner

C. W. IVY, Assistant Examiner

U.S. Cl. X.R.

161—186; 260—37, 18, 32.8, 31,2, 33.6, 33.8, 75, 77.5